Nov. 12, 1935.  A. M. WARREN  2,020,747
AUTOMOBILE HEATER
Filed Jan. 31, 1934
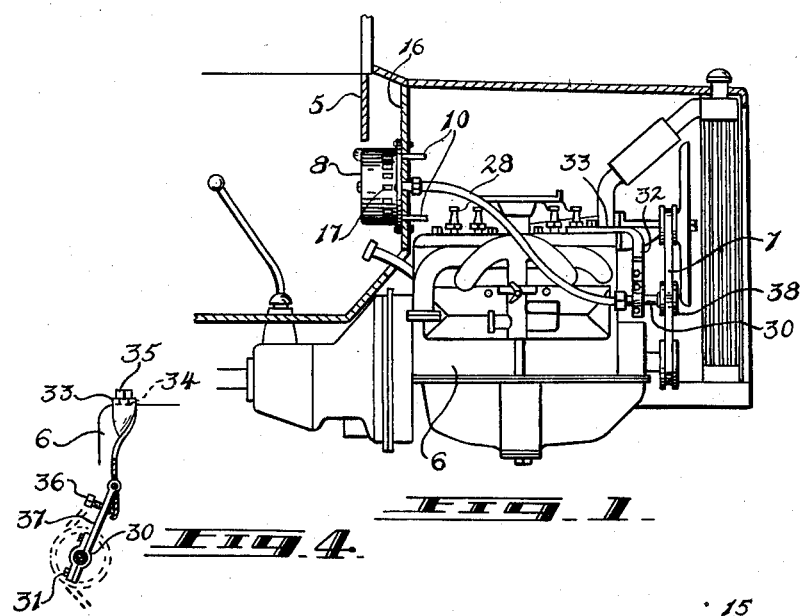
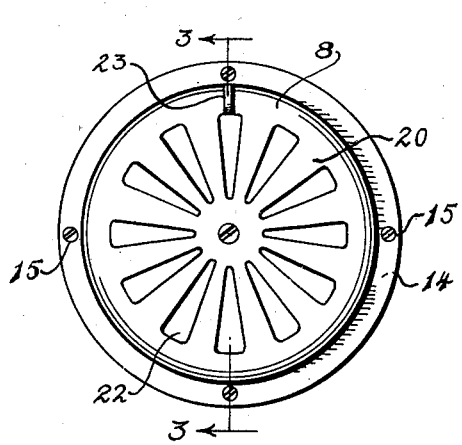
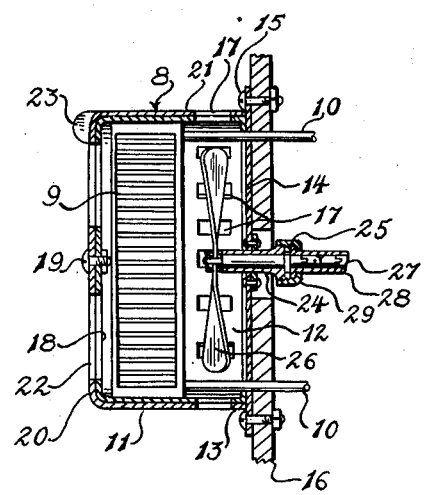
INVENTOR
Arthur M. Warren
ATTORNEY Patented Nov. 12, 1935

2,020,747

UNITED STATES PATENT OFFICE 2,020,747

AUTOMOBILE HEATER

Arthur Moses Warren, Saskatoon, Saskatchewan, Canada

Application January 31, 1934, Serial No. 709,177

4 Claims. (Cl. 257—137)

This invention relates to improvements in an automobile heater and appertains particularly to a motor driven fan for circulating air warmed by a radiator connected with the conventional engine cooling system.

An object of the invention is to provide an air circulating fan driven by the engine by application of a connected pulley with the usual fan belt and wherein the fan created draft is readily shut off without disconnecting the fan from the engine fan belt drive.

A further object of the invention is to provide an automobile hot water heater with an air circulating fan in a suitable enclosure so that the draft normally set up can be controlled without stopping its rotating which continues all the while the engine is running.

A further object of the invention is to provide an automobile hot water heater with an air circulating fan that is easily and quickly installed and capable of adaptation to almost any standard make of motor car by possessing universally adjustable attaching members.

A still further object of this invention is the provision of an automobile heater of the nature and for the purposes described that is characterized by structural simplicity, durability and low cost of production, being thereby rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and more clearly described when reference is had to the drawing forming a part of this disclosure wherein in like characters indicate like parts throughout the several views.

In the drawing:—

Figure 1 is a side elevation of a motor car equipped with the device;

Figure 2 is a front elevation of the heater unit;

Figure 3 is a vertical longitudinal section thereof, as taken on line 3—3 of Figure 2; and Figure 4 is an enlarged elevational detail, partly in section, of the adjustable pulley bracket.

It is recognized as common practice to tap the fluid jacket or line of an automobile engine cooling system and run a lead to and from a radiator unit positioned in the coach body and a fan to create an air draft therethrough has been used but this fan in conventional installation is ordinarily run by a small electric motor whose variations in speed can only be controlled within almost uselessly narrow limits and whose electric consumption constitutes a burdensome drain on the battery.

In seeking to avoid dependance of the battery, the automobile engine has been found the most useful source of motivation and the usual fan belt the most generally available power line source. The varying accessibility of the fan belt, has necessitated an adjustable attaching bracket and the regulating of the frictional engagement of the heater fan drive pulley with the belt has also been cared for.

Since the heater fan is thus definitely connected to the engine and so operates all the time the engine is running some more positive way of controlling the created draft than deflecting shutters or baffles is necessary and so a new fan and heater enclosing casing is provided whereby the draft regulation is under the complete control of the vehicle operator who can open or shut the same or secure any fraction of the full draft desired.

With this arrangement, the fan, whether the casing is opened or closed is almost noiseless.

The drawing shows a motor car generally designated by the numeral 5, having an engine 6 and fan belt 7. The heater 8 comprises a circular hot water radiator jacket 9 connecting by inlet and outlet pipes 10 with the cooling fluid system of the engine 6. This radiator 9 is positioned near the front of a housing 11 with an open back 12 provided with an inturned peripherial flange 13. By the flange 13 the housing 11 fastens to a mounting plate 14 that extends outwards beyond the housing 11 and by which the same is supported, attaching means 15 extending through the free outer edges of this plate 14 and connecting it firmly to the dash 16 or other appropriate place in the vehicle.

A circumferential row of spaced openings 17 occur around the periphery of the housing near the back, being spaced from each other a greater distance than their width. These constitute the air inlet openings. In the front face of the housing air outlet openings 18 are provided in a circular arrangement, being also spaced a greater distance than their width. A central opening in the face of the housing accommodates a pivot fastening means 19, such as the nut and bolt shown, by which the outer shell or casing 20 is mounted thereon being similar in outer contour with the housing 11 but lacking the rear peripherial flange though extending over the housing 11 right back to the mounting plate 14. A circumferential row of spaced openings 21 and a series of openings 22 correspond with the air inlet and outlet openings 17 and 18 respectively and are arranged for simultaneous registry with the two formerly described series of openings. The attachment of the nesting outer casing 20 to the housing 11 by the central pivot 19 allows the casing to rotate on the fixed housing, a suitable handle lug 23 being provided, so that all the registering air inlets 17 and 21 and air outlets 18 and 22 can be opened or closed as desired.

It will be noted, on referring to Figure 3, that the windowed front of the housing 11 is just in advance of the radiator 9 while the circumferential row of air inlet openings 17 surround a generous space between the back of the radiator 9 and the mounting plate 14.

A central opening in the mounting plate 14 receives a bearing sleeve 24 for a shaft 25 that carries a fan 26 on its forward end inside the housing 11 and in that open space behind the radiator. The rear of the shaft 25 connects with a flexible shaft 27 enclosed in the covering 28 that is coupled to the bearing sleeve 24 by the flanged collar 29.

From the back of the shaft 28, the flexible shafting 27 extends toward the front of the automobile to connect with a shaft (not seen) in a longitudinally adjustable bearing 30 clamped by the keeper 31 on the bottom of an upwardly slanting supporting bracket 32 that attaches to the top of the engine block, its free upper end 33 being bent horizontal and forked with a slot 34 in from the end to slidingly accommodate one of the engine head bolts 35. This bracket 32 is hinged vertically near its middle, the lower half having an adjustment screw 36 that bears against an extension finger 37 on the upper part to swing the shaft carrying bearing 30 outwardly (or inwardly if the adjustment screw 36 is reversed).

The end of the shafting 27 and its extension housed in the bearing 30 carries a pulley wheel 38 forwardly of the said bearing for engagement with the automobile fan belt 7. It will be seen that the bracket 32 will allow the pulley 38 to be adjusted longitudinally and swung upwardly and sidewardly so that good engagement with the fan belt is assured.

From the foregoing description taken in connection with the accompanying drawing, it will be manifest that an automobile heater is provided that will fulfill all the necessary requirement of such a device, but as many changes could be made in the above description and many apparently widely different embodiments of the invention may be constructed within the scope of the appended claims without departing from the spirit or scope thereof, it is intended that all matters contained in the said accompanying specification and drawing, shall be interpreted as illustrative and not in a limitative or restrictive sense.

Having thus described the invention, what is claimed as new is:—

1. In an automobile heater the combination with a radiator unit of a housing completely enclosing the same, a circumferential row of spaced air inlet openings near the back of the periphery thereof spaced from each other a distance greater than their width, a circular series of air outlet openings in the front face thereof similarly spaced from each other a greater distance than their width and an adjustable shell for regulating said openings.

2. An automobile heater comprising a radiator unit, a housing therefor, a mounting plate attached to the back thereof thereto, an outer casing rotatably carried by said housing and nesting thereover, registering air inlet and outlet openings in said housing and outer casing, a fan in said housing behind said radiator unit, a flexible shaft from said fan projecting through said mounting plate, and means for driving said shaft.

3. In an automobile heater the combination with a radiator unit, of a housing completely enclosing the same, a circumferential row of spaced air inlet openings near the back of the periphery thereof, a circular series of air outlet openings in the front face thereof, and an outer casing nesting over said housing and adapted to rotate thereon.

4. In an automobile heater the combination with a radiator unit, of a housing completely enclosing the same, a circumferential row of spaced air inlet openings near the back of the periphery thereof, a circular series of air outlet openings in the front face thereof, an outer casing nesting over said housing and adapted to rotate thereon having a corresponding circumferential row of air inlet openings in its periphery and a corresponding circular series of air outlet openings in its front face, said corresponding rows of inlet and corresponding series of outlet openings respectively being adapted to register simultaneously.

ARTHUR MOSES WARREN.